(No Model.)
M. FRED.
PAINTER'S IMPLEMENT.
No. 429,515. Patented June 3, 1890.
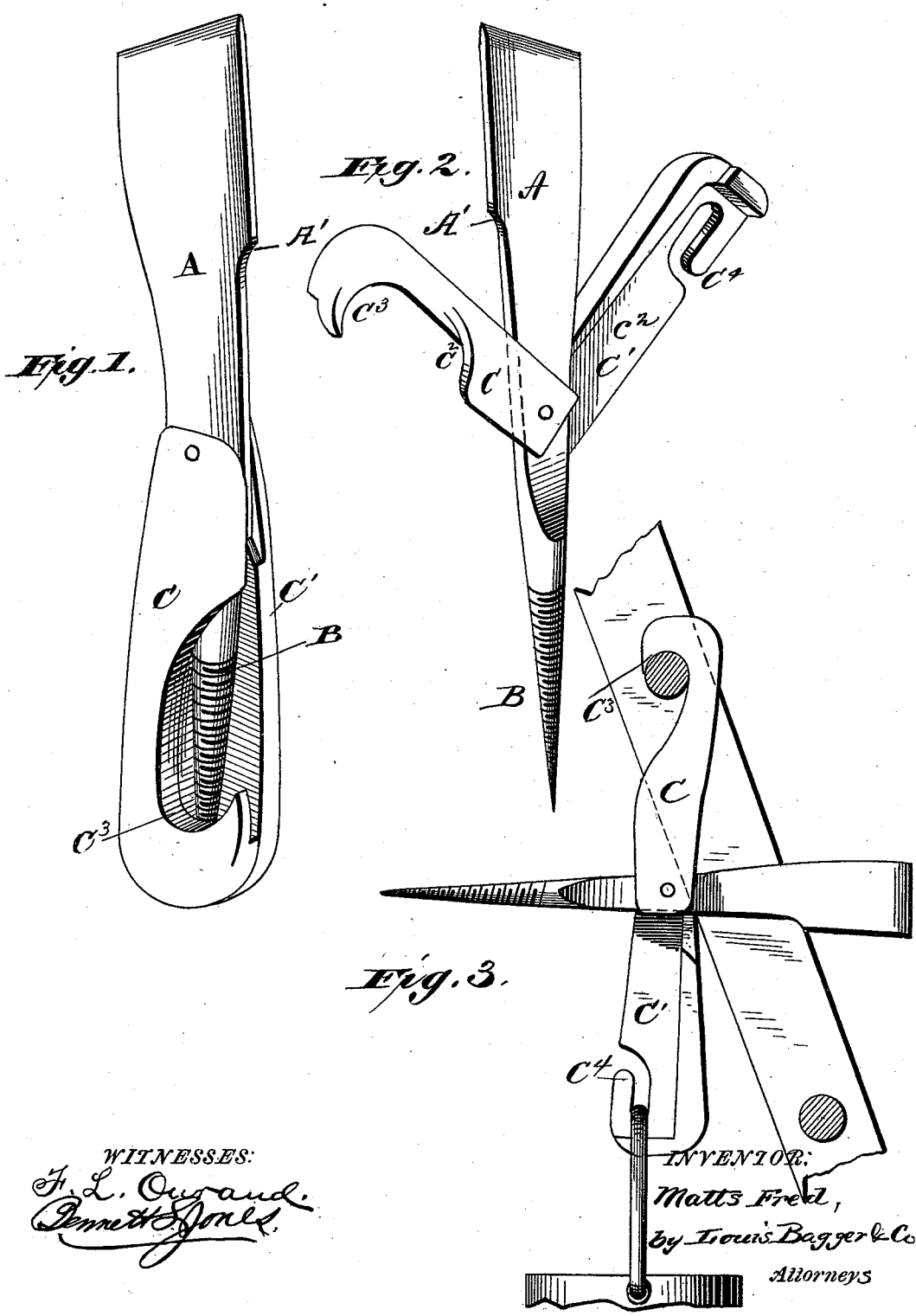
WITNESSES:
INVENTOR:
Matts Fred,
by Louis Bagger & Co
Attorneys

UNITED STATES PATENT OFFICE.

MATTS FRED, OF HANCOCK, MICHIGAN.

PAINTER'S IMPLEMENT.

SPECIFICATION forming part of Letters Patent No. 429,515, dated June 3, 1890.

Application filed December 10, 1889. Serial No. 333,183. (No model.)

*To all whom it may concern:*

Be it known that I, MATTS FRED, a citizen of the United States, and a resident of Hancock, in the county of Houghton and State of Michigan, have invented certain new and useful Improvements in Painters' Implements; and I do hereby declare that the following is a full, clear, and exact description of the invention, which will enable others skilled in the art to which it appertains to make and use the same.

My invention relates to improvements in what may be termed a "painter's implement," the same combining in a single implement a putty-knife, screw to serve as a hold for the painter while painting, and a paint-pot hanger.

The object of my invention is the provision of an implement of the character mentioned which will contain the separate devices in a single implement, each device being thoroughly efficient for its respective purpose, and the implement itself being as inexpensive of production, or nearly so, as either of said tools.

To attain the desired object the invention consists of the novel and peculiarly-constructed device illustrated, described, and claimed herein.

Figure 1 represents a perspective view of the device as a putty-knife. Fig. 2 represents a perspective view thereof, showing the screw; and Fig. 3 represents a side view thereof as a paint-pot hanger.

Referring by letter to the drawings, A designates the blade of the putty-knife, which is formed with the corner A', and the shank of the knife is formed into a screw B, adapted to serve as a hold for the painter when screwed into a wall or other place.

C and C' designate the members of the handle, which are pivoted at their upper ends to the shank of the knife, and are formed with the channels or recesses $C^2$ to receive the screw when the handles are closed upon the screw, and the member C of the handle is formed with the hook $C^3$ to engage the round of a ladder or a device on the wall, and the member C' is provided with a hook $C^4$ to receive the bail on a paint-pot and serve as a hanger for said pot.

From the drawings and description it will be readily seen how the device serves in its respective offices and herein needs no further explanation.

It is evident that I provide an inexpensive implement which possesses features of merit calculated to commend it to all desirous of possessing such an article.

Having thus described my invention, I claim and desire to secure by Letters Patent of the United States—

The herein-described implement, consisting of the knife-blade A, having the screw-shank B, the two-part handle C C', each pivoted to the knife and provided with hooks $C^3$ $C^4$ and channels $C^2$ to receive the screw when the handles are closed, substantially as set forth.

In testimony that I claim the foregoing as my own I have hereunto affixed my signature in presence of two witnesses.

MATTS FRED.

Witnesses:
 MATTI ESKLI,
 JACOB POVE.